(12) United States Patent
Sridhara et al.

(10) Patent No.: US 8,385,243 B2
(45) Date of Patent: Feb. 26, 2013

(54) METHOD OF SELECTING BIT RATE AND TRANSMIT POWER FOR ENERGY-EFFICIENT TRANSMISSION

(75) Inventors: Vinay Sridhara, Santa Clara, CA (US); Saumitra Mohan Das, San Diego, CA (US); Alok Aggarwal, Foster City, CA (US)

(73) Assignee: QUALCOMM Incorporated, San Diego, CA (US)

( * ) Notice: Subject to any disclaimer, the term of this patent is extended or adjusted under 35 U.S.C. 154(b) by 297 days.

(21) Appl. No.: 12/817,036

(22) Filed: Jun. 16, 2010

(65) Prior Publication Data
US 2011/0176468 A1 Jul. 21, 2011

Related U.S. Application Data

(60) Provisional application No. 61/295,918, filed on Jan. 18, 2010.

(51) Int. Cl.
*G08C 17/00* (2006.01)
(52) U.S. Cl. ........................................................ 370/311
(58) Field of Classification Search ........................ None
See application file for complete search history.

(56) References Cited

U.S. PATENT DOCUMENTS

| | | | |
|---|---|---|---|
| 6,944,460 B2 | 9/2005 | Haartsen | |
| 7,245,946 B2 | 7/2007 | Liu | |
| 7,702,290 B1 * | 4/2010 | Myers | 455/69 |
| 2006/0215601 A1 | 9/2006 | Vleugels et al. | |
| 2007/0086346 A1 * | 4/2007 | Wentink | 370/236 |
| 2008/0159184 A1 * | 7/2008 | Niwano | 370/278 |
| 2008/0221988 A1 * | 9/2008 | Bappu et al. | 705/14 |
| 2009/0316805 A1 | 12/2009 | Miao et al. | |
| 2010/0081389 A1 * | 4/2010 | Lawrow et al. | 455/67.11 |

FOREIGN PATENT DOCUMENTS

| | | |
|---|---|---|
| WO | WO9907105 | 2/1999 |
| WO | WO0131945 A1 | 5/2001 |
| WO | WO2007056738 A2 | 5/2007 |
| WO | 2009099810 | 8/2009 |

OTHER PUBLICATIONS

International Search Report and Written Opinion—PCT/US2011/021572—ISA/EPO—Apr. 29, 2011.

* cited by examiner

*Primary Examiner* — Chirag Shah
*Assistant Examiner* — Minh-Trang Nguyen
(74) *Attorney, Agent, or Firm* — Kevin T. Cheatham

(57) ABSTRACT

A time-of-propagation distance-determining method involves sending a probe request from a handset to an AP and receiving a return ACK. The time it takes for the probe request to propagate to the AP, the turnaround time, and the time it takes the ACK to propagate back to the handset is measured on the handset. The turnaround time is subtracted from the measured time, and the result is used to make a distance determination. In order to reduce power consumption, the "lowest overall transmit energy" setting that will give acceptable reception of a probe request sent by the handset to the AP station is determined. The lowest overall transmit energy setting involves a bit rate setting and a transmit power setting. The lowest overall transmit energy setting is used to send probe requests when probe requests are sent from the handset in carrying out a time-of-propagation distance-determining transaction.

11 Claims, 5 Drawing Sheets

LOCATION-BASED APPLICATION OF THE
LOW-POWER TIME-OF-PROPAGATION
DISTANCE-DETERMINING TRANSACTION

OVERALL TRANSMIT ENERGY VERSUS BIT RATE SETTING
(ASSUMING THE TRANSMIT POWER SETTING IS CONSTANT)

METHOD OF SELECTING BIT RATE AND TRANSMIT POWER FOR ENERGY-EFFICIENT TRANSMISSION

CROSS-REFERENCE TO RELATED APPLICATION

This application claims the benefit under 35 U.S.C. §119 of Provisional Application Ser. No. 61/295,918, filed Jan. 18, 2010, entitled "Method of Selecting Rate and Modulation of Probe Packets for Energy Efficient Ranging", by Sridhara et al., said provisional application is incorporated herein by reference.

BACKGROUND INFORMATION

1. Technical Field

The disclosed embodiments relate determining a bit rate and transmit power for energy-efficient packet transmission.

2. Background Information

Knowing the location of a non-AP station (for example, a cellular telephone handset having a WiFi capability), on the handset, as the user carries the handset throughout an area served by a plurality of APs (Access Points) is useful and has multiple applications. One way to determine the location of a handset involves triangulation between APs. Distances from the handset to a number of APs are determined, and these distances and other information about the locations of the APs are then used to determine the location of the handset. A signal-strength-based distance-determining method may be used. In a WiFi IEEE 802.11 network, a handset can transmit to an AP using different bit rate settings and different transmission power settings. The combination of the bit rate setting and the transmission power setting determines the overall energy required to transmit a bit of a transmission. The AP periodically transmits transmissions called beacons. The transmit power with which the AP transmits a beacon could be estimated over time by the handset. The handset that receives a beacon is able to make an assessment of signal strength (RSSI) as the beacon is received at the handset. From the known transmit power with which the beacon was sent, and from the measured RSSI of the beacon as received, the handset can make an assessment of channel loss. Channel loss from the AP to the handset and from the handset to AP is generally symmetric. There is a relationship between channel loss and distance, so from the determined channel loss information the handset can make an approximation of the distance between the handset and the AP. Unfortunately, the environment and obstructions between a transmitter and a receiver can affect channel loss. For the same distance between a handset and an AP there may be different signal strengths as detected at the receiver depending on different environmental conditions and obstructions that might exist between the AP and the handset. Consequently, the determination of distance can have substantial error and is somewhat unreliable and environmentally dependent.

SUMMARY

A time-of-propagation distance-determining transaction and method involves sending a probe request transmission from a non-AP station (for example, a cellular telephone handset having a WiFi capability) to an AP and receiving a return acknowledgement transmission (ACK) back from the AP. The propagation time it takes for the probe request to propagate from the handset to the AP, the turnaround time it takes the AP to receive the probe request and to send back an ACK, and the propagation time it takes for the ACK to propagate from the AP back to the handset is measured on the handset. The turnaround time is subtracted from the measured time to determine a round-trip propagation time. The round-trip propagation time is used to make a distance determination of the distance from the handset to the AP. Distance determining is sometimes referred to as "ranging." In order to reduce power consumption in such a time-of-propagation transaction, the "lowest overall transmit energy" setting that will give acceptable reception of a probe request sent by the handset to the AP station is determined. Achieving acceptable reception may require that the "lowest overall transmit energy" setting involve slightly more transmit energy than is absolutely required such that a measure of dependability of the probe request being received is attained.

There are several possible ways that the lowest overall transmit energy setting can be determined. In a first way, a beacon is received onto the handset and this reception is used to make a channel loss determination. A predetermined overall transmit energy setting is then adjusted in order to compensate for the determined channel loss, thereby generating the lowest overall transmit energy setting. In a second way, a sequence of probe requests is transmitted from the handset to the AP. The first probe request is transmitted using a high overall transmit energy setting and an ACK is received in return. Each successive probe request of the sequence is sent using a smaller overall transmit energy. When one of the probe requests does not result in an ACK being returned, then the sequence is stopped. The lowest overall transmit energy setting is the setting used to transmit the last probe request that resulted in an ACK being returned. In a third way, a binary search technique is used to determine the two adjacent overall transmit energy settings where the sending of a probe request at one of the setting results in an ACK being sent back and where the sending of a probe request at the other of the settings does not result in an ACK being sent back. If a binary search is employed, the overall transmit energy setting is changed in step 204 in a binary pattern rather than the overall transmit energy setting being continuously reduced. The lowest overall transmit energy setting is the one of the two settings that results in the ACK being sent back. A central objective is to learn the minimum energy setting as a function of channel loss. Once learned, the procedure does not need to be repeated. Other ways of determining the lowest overall transmit energy setting are possible.

Regardless of how the lowest overall transmit energy setting is determined, the setting is then used to send a probe request from the handset to the AP in a time-of-propagation distance-determining transaction. In one example, the time-of-propagation distance-determining transaction is part of a location-determining operation in which the handset determines its location in an area served by multiple APs.

Although use of the determined lowest overall transmit energy setting is usable in optimizing ranging as described above, the determined lowest overall transmit energy setting is also usable in optimizing other wireless Local Area Network (LAN) packet transmissions including, but not limited to, the energy-efficient transmission of data, control and management frames. Although the method of determining the lowest overall transmit energy setting can be carried out using probe requests, the method can also be carried out using other types of wireless LAN packets.

The foregoing is a summary and thus contains, by necessity, simplifications, generalizations and omissions of detail; consequently, those skilled in the art will appreciate that the summary is illustrative only and does not purport to be limiting in any way. Other aspects, inventive features, and advan-

DETAILED DESCRIPTION

Figure 1:
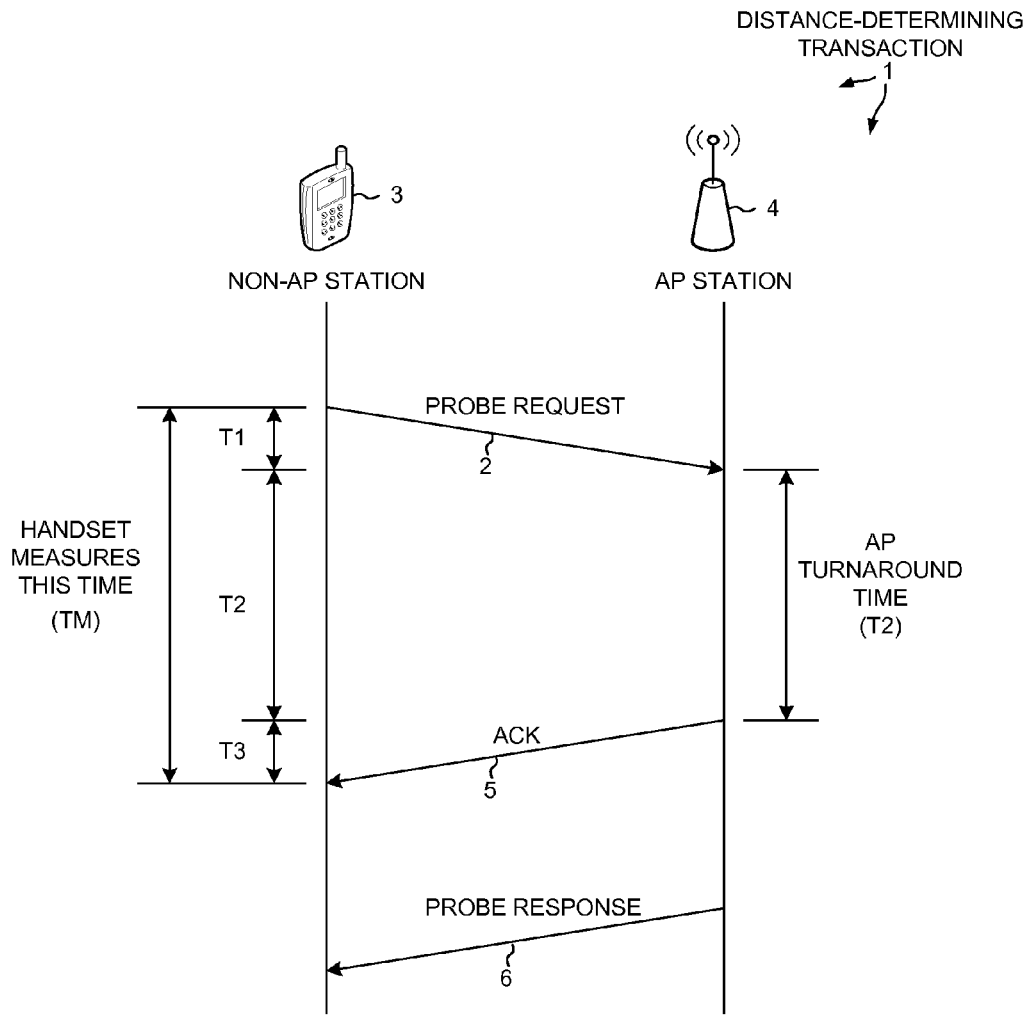
FIG. 1 is a diagram of a low-power time-of-propagation distance-determining transaction.

FIG. 1 is a diagram of a low-power time-of-propagation distance-determining transaction and method 1. The transaction involves sending a transmission called a "probe request" 2 from a non-AP station 3 (for example, a mobile communication device such as a cellular telephone handset) to an AP station 4. In sending the probe request, if the bit rate is low then more time is required at the transmitter of the handset to transmit each bit of the probe request. If the bit rate is high, then a shorter amount of time is required at the transmitter of the handset to transmit each bit of the probe request. How long it takes to transmit the probe request 2 therefore depends on the bit rate. The time T1 it takes for the probe request 2 to propagate from the handset 3 to the AP 4 is, however, a function of the distance between the handset 3 and the AP 4 and is independent of the bit rate used.

Next in the time-of-propagation distance-determining transaction there is a turnaround time T2. Turnaround time T2 is generally dependent on both the manufacturer as well as the applicable IEEE 802.11 standard. Turnaround time T2 is the time it takes the AP 4 to receive the probe request 2 and to send an acknowledgement transmission 4 (ACK) back to the handset 3. Time T3 is the time of propagation of the ACK from the AP to the handset. In addition to the AP sending the ACK back, the AP 4 later sends a "probe response" 6 back to the handset per the IEEE 802.11 standard. The time-of-propagation-based distance-determining transaction does not depend on the receipt of the "probe response" 6, nor does it depend on a probe response ever having been sent. The distance-determining transaction uses ACK 5 to measure the time TM. As illustrated in FIG. 1, time TM includes the time T1 of propagation of the probe request, the AP turnaround time T2, and the time T3 of propagation of the ACK from the AP back to the handset.

IEEE 802.11 specifies a minimum amount of turnaround time that an AP is permitted to spend before it is required to send the ACK back. The actual amount of turnaround time T2, however, differs depending on the manufacturer and type of AP. Nonetheless, APs usually have hardware MAC processing circuitry and as a result the turnaround time of a given AP is substantially fixed. The handset can measure or otherwise characterize the turnaround time T2 for a given AP and can then eliminate the turnaround time as a variable in the time-of-propagation distance-determining transaction. In the same way that bit rate affects how long it takes the handset to transmit the probe request, so too does the bit rate affect how long it takes the handset to receive the ACK.

In the time-of-propagation-based distance-determining transaction of FIG. 1, distance is determined on handset 3. First, the time TM is measured. The turnaround time T2 is subtracted from measured time TM to generate a composite round-trip propagation time T1+T3. This round-trip propagation time is used to make a distance determination of the distance from the handset to the AP.

When sending probe request 2 in this method, the handset 3 can be programmed to use one of the following standards: 802.11(a) or (b) or (g) or (n). Which one is used defines a set of permissible bit rate settings that can be used. As explained above, if a low bit rate is used, then it takes a long time to send out the probe request. The transmitter of the handset is therefore on for a long time and this consumes a lot of energy. It also takes a long time to receive the ACK onto the handset, so the receiver of the handset is on for a long time, and this consumes a lot of energy. Using a low bit rate therefore consumes a relatively large amount of energy in the handset. Using a high bit rate reduces energy consumption by reducing the amount of time the transmitter and receiver of the handset are on, but the AP may not be able to receive the probe request and/or the handset may not be able to receive the ACK. At a given transmit power setting, if a higher bit rate is used, then the probability of the constellation being corrupted by noise over a given distance is increased. Generally speaking, a smaller amount of noise can corrupt the signal such that the AP cannot receive the probe request.

In accordance with one novel aspect, the combination of the bit rate setting and the transmit power setting is selected (for use in the "time-of-propagation-based distance-determining method") that results in the "lowest overall transmit energy" for transmission of a probe request for an acceptable receive signal strength at the AP. The term "overall transmit energy setting" in this specific example refers to a combination of a bit rate setting and a transmit power setting. Achieving the acceptable reception of the probe request may require that the lowest overall transmit energy setting involve slightly more transmit energy than is absolutely required such that a measure of communication dependability is attained. The use of the lowest overall transmit energy setting in the carrying out of the time-of-propagation-based distance-determining transaction reduces energy consumption of the distance-determining transaction. There are multiple ways that the handset can determine the lowest overall transmit energy setting. Three ways are set forth below for illustrative purposes.

The first way of determining the lowest overall transmit energy setting involves use of certain information referred to as a "table." Each AP station and handset chipset vendor typically provides a table. This table indicates a minimum signal strength required for reception of an array of bit rates permissible under a given standard. The table basically represents the receiver characteristic of a given chipset. Typically there is such a table for the AP station, and there is another such table for the handset. The handset is not necessarily aware of the table for the AP, but the tables for the handset and AP station typically do not vary by much from each other so the handset uses the table for the handset in the following channel loss compensation method. It is also conceivable that the handset learns this table over a period of time by the second or third ways described above, or any other way. Although this information is generally referred to as a table, the information can actually be stored in any suitable way and format. The term table refers to the relationship of information and type of information stored.

The handset receives a beacon from the AP station, and the handset makes an assessment of "channel loss" as described above using knowledge of the estimated transmit power with which the AP station transmitted the beacon and using the measured RSSI at the handset in receiving the beacon. The lowest overall transmit energy setting is determined by taking a predetermined overall transmit energy setting (in one example the predetermined overall transmit energy setting involves the maximum permissible bit rate obtained from the table) and adjusting this predetermined overall transmit energy setting to compensate for the determined channel loss. The energy of the transmission can be increased by decreasing the bit rate setting, or by increasing the transmission power setting, or both. The result of the channel loss compensation adjustment is a bit rate setting and a transmit power setting that the handset can use to transmit to the AP station with lowest "overall transmit energy". Only one beacon needs to be received from the AP station to make this determination. Multiple beacons, however, can be used to get a better average of the channel loss.

Figure 2:
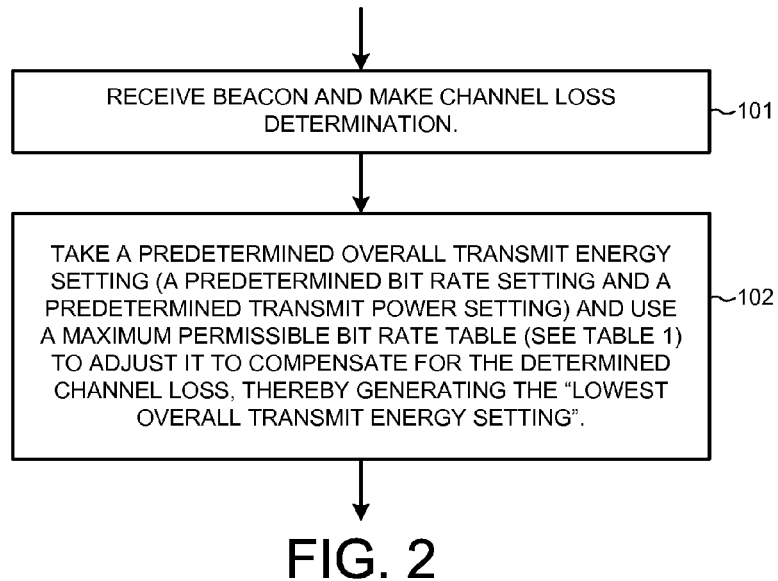
FIG. 2 is a flowchart that illustrates a first way that the lowest overall transmit energy setting can be determined.

FIG. 2 is a flowchart of the first way of determining the lowest overall transmit energy. The handset has an initial transmit power setting (for example, its maximum transmit power setting of 17 dBm). The received signal strength (for an AP-to-handset beacon transmission) is determined on the handset (for example, −62 dBm). Because the transmission is known by the handset to have been a beacon, and because the transmit power used to transmit beacons is known, the transmit power that was used by the AP station to make the transmission is known to be 17 dBm. The handset can therefore determine the channel loss (step 101) to be 79 dB (17 dBm+62 dBm).

The handset is aware of a maximum permissible bit rate table (see Table 1 below) that indicates the minimum receive power that is required in order for the AP to receive at each of a plurality of permissible bit rate settings.

TABLE 1

| Index (i) | Bit Rate Setting ($R_{TX, i}$) | Minimum Required Receive Power ($P_{Req, i}$) (Min. RSSI) |
|---|---|---|
|  | 54 Mbps | −71 dBm |
|  | 48 Mbps | −75 dBm |
|  | ... | ... |
| 2 | 9 Mbps | −86 dBm |
| 1 | 6 Mbps | −90 dBm |

Table 1 indicates that −71 dBm is the minimum RSSI needed in order for the AP to receive a 54 Mbps transmission (54 Mbps is the maximum bit rate transmission in 802.11). If, however, the handset were using a transmit power setting of 17 dBm, then the signal as received at the AP would have a greater signal strength of −62 dBm (17 dBm transmit power plus 79 dB channel loss), rather than the required −71 dBm. If the handset were to transmit at 17 dBm, then the handset would transmit with 9 dBm more power than necessary. The handset therefore determines that it can transmit with a reduced transmit power setting of 8 dBm and the AP will be still able to receive at 54 MBps. This determination of the lowest overall transmit energy therefore involves adjusting (step 102) the overall transmit energy setting by adjusting the transmit power down from 17 dBm to the 8 dBm setting that reduces overall transmit energy to the lowest overall transmit energy necessary to receive a bit rate of 54 MBps. The lowest overall transmit energy setting is the bit rate setting of 54 Mbps and the transmit power setting of 8 dBm. Rather than adjusting the transmit power setting down as far as possible to 8 dBm, the initial transmit power setting of 17 dBm can be adjusted down a somewhat lesser amount in order to take into account extra losses that might be undetermined due to non-symmetric nature of the channel. The lowest overall transmit energy setting in this example may, for example, be the bit rate setting of 54 Mbps and a transmit power setting of 9 dBm.

Below is a specific example of the first way that the lowest overall transmit energy setting can be determined. The variables used in this specific example have meanings as follows: RTx is the transmit bit rate of the RTT probe in Mbps; Pmax is the maximum allowed transmit power in dBm; C is the channel loss between the handset and the AP in dB; Preq is the minimum required receive power in dBm; PTx is the handset RF transmit power for the RTT probe in dBm; PRx is the receive power for the probe acknowledgment; Pmin is the minimum allowed power in dBm; TTx is the handset RF transmit time for the RTT probe in microseconds; TRx is the bit rate of the RTT probe as received in Mbps; E is the handset total RF energy for the RTT in nJ, and index i is a looping index and is also an index that identifies a row in the table of Table 1. The probe request transmit power PTx must be greater than or equal to Pmin and must be smaller or equal to Pmax. The Pmax constraint occurs because the handset power amplifier has a maximum output capability and also because of FCC restrictions imposed by the wireless standard. The Pmin constraint occurs because the handset transmission must be received by other handsets in radio range in order for the CSMA (carrier-sense multiple access) protocol to work correctly.

First, the channel loss C is determined (step 101). The handset can estimate this channel loss C by measuring the received signal strength of beacons from the AP, and by knowing the AP beacon transmit power. Next (step 102), the handset determines lowest overall transmit energy setting using the following looping method. Starting with the highest RTx,i transmit bit rate, a determination is made as to whether (Pmax-C) is greater than or equal to Preq,i. If the answer is yes, then the bit rate RTx,i is determined to be achievable. The transmit power PTx,i is set to max(Pmin,Preq,i+C). This is the minimum necessary transmit power to have the AP receive the probe transmission. The receive bit rate RRx,i is estimated to be a function of RTx,i. The PRx,i is estimated based on RRx,i. For example, multiple streams or higher bandwidth lead to higher power consumption. The TTx,i and TRx,i times are calculated using the given probe and ACK length and the selected bit rate. The energy required Ei is calculated. If, on the other hand, (Pmax-C) is smaller than Preq,i. then it is determined that RTx,i is not achievable, and the process is repeated using the next highest bit rate RTx,i from Table 1. In this notation, the second time the process is performed the index is increased from 1 to 2. As indicated in Table 1, the possible transmit bit rate RTx,i that was 54 Mbps on the first pass through the method when i was 1 is now 48 Mbps on the second pass through the method when i is 2. The looping of this method continues until the handset transmit power setting PTx and the bit rate setting RTx (PTx and RTx together are the lowest overall transmit energy setting) are determined.

Using the looping method, the handset selects the bit rate setting RTx,i that gives the minimum energy Ei. If two bit rate settings give the same energy, then the handset can select the lower bit rate setting to increase robustness, because lower bit rates can be decoded with greater reliably in the presence of noise and interference. Alternatively the handset can select the higher bit rate setting to minimize the RTT ranging duration, and thereby increase overall channel capacity. If the probe and ACK lengths L are fixed, as is usually the case in RTT ranging, then the handset can precompute the optimal bit rate RTx and transmit power PTx for each possible value (or range) of channel loss C. The handset can then simply look up the best bit rate setting and transmit power setting to use, for example in a table, after estimating the channel loss.

Figure 3:
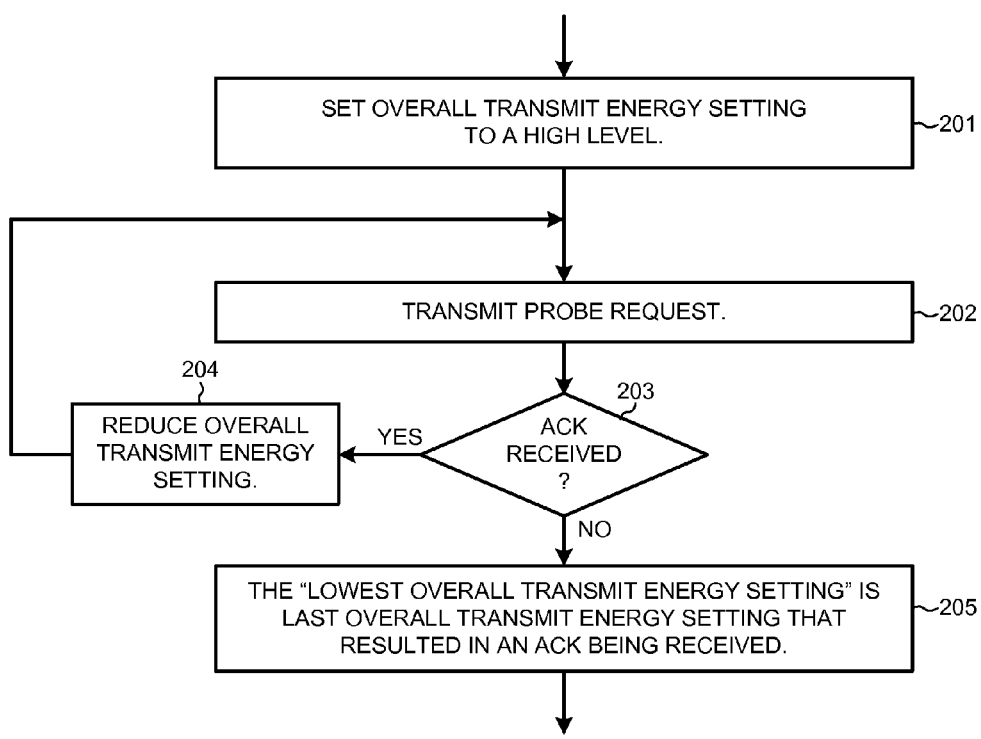
FIG. 3 is a flowchart that illustrates a second way that the lowest overall transmit energy setting can be determined.

FIG. 3 is a flowchart that illustrates a second way that the lowest overall transmit energy setting can be determined. The overall transmit energy setting is initially set to a high level (step 201) and a probe request is transmitted (step 202) using this overall transmit energy setting. The AP station sends back an ACK (step 203), and the overall transmit energy setting is reduced (step 204). The sending of a probe request (step 202) is repeated. In this way, a sequence of probe requests is transmitted from the handset, where successive probe requests in the sequence have ever decreasing overall transmit energies. For each probe request, the AP station sends back an ACK. At some point in the sequence, the overall transmit energy is so low that the AP station does not receive the probe request. The AP station therefore does not send back an ACK. If no ACK is received (step 203), then the "lowest overall transmit energy" setting is assigned to be (step 205) the last overall transmit energy setting that resulted in an ACK being received. This lowest overall transmit energy setting is later used to send probe requests in a "time-of-propagation-based distance-determining transaction".

In a third way, the lowest overall transmit energy setting is determined using a binary search on the indices of an array of permissible bit rate settings. A mid-level overall transmit energy setting is used to send a first probe request. If an ACK is received, then the overall transmit energy for the second probe request is 0.5 times the first mid-level overall transmit energy setting. If, however, an ACK is not received, then the overall transmit energy for the second probe request is 2.0 times the first mid-level overall transmit energy setting. This process is repeated in binary search fashion until two adjacent overall transmit energy settings are found where the sending of a probe request at one of the setting results in an ACK being sent back and where the sending of a probe request at the other of the settings does not result in an ACK being sent back. The lowest overall transmit energy setting is the one of these two settings that results in the ACK being sent back.

Regardless of the particular way that the "lowest overall transmit energy" setting is determined, this setting is used to send a subsequent distance-determining probe requests in a "time-of-propagation distance-determining transaction." By using the "lowest overall transmit energy" setting to send the probe requests, overall energy consumption of the handset is reduced. This is a way of learning the table for further energy-efficient transmission.

Figure 4:
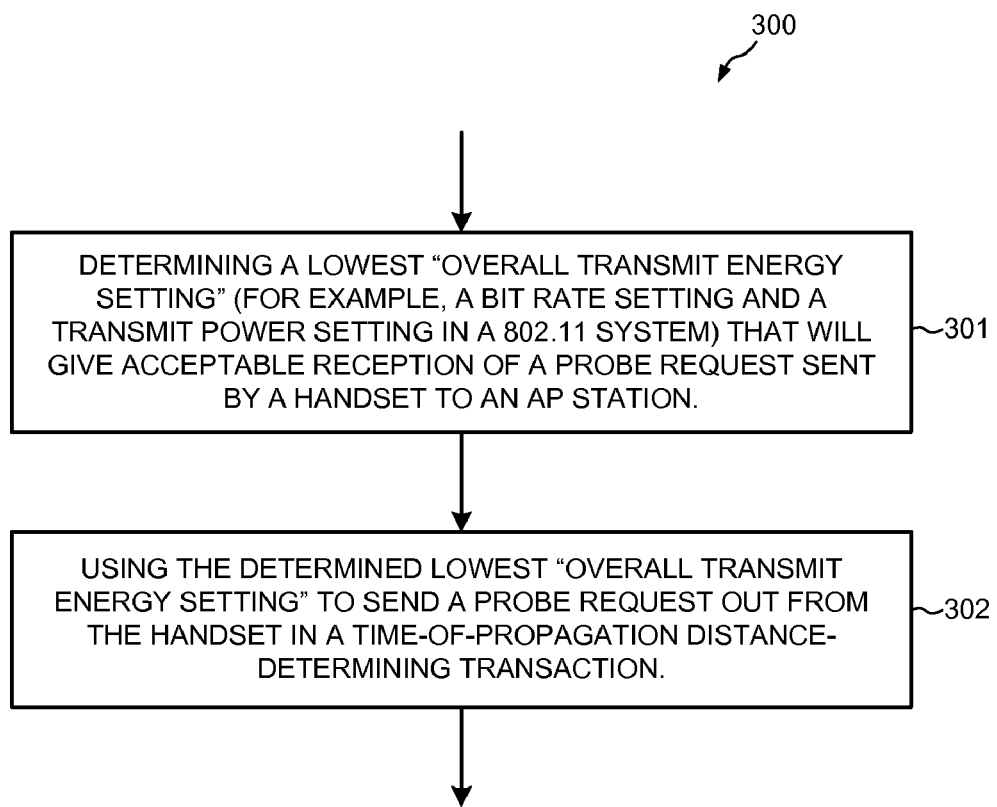
FIG. 4 is a flowchart of a method of reducing energy consumption in the time-of-propagation distance-determining transaction of FIG. 1.

FIG. 4 is a diagram of a method 300 of reducing power consumption in a time-of-propagation-based distance-determining transaction. In a first step 301, a lowest overall transmit energy setting (for example, a bit rate setting and a transmit power setting) that will give acceptable reception of a probe request sent by handset 3 to AP 4 is determined. In a second step 302, the determined lowest overall transmit energy setting is used to send probe request 2 out from handset 3 to AP 4 in the time-of-propagation distance-determining transaction.

Figure 5:
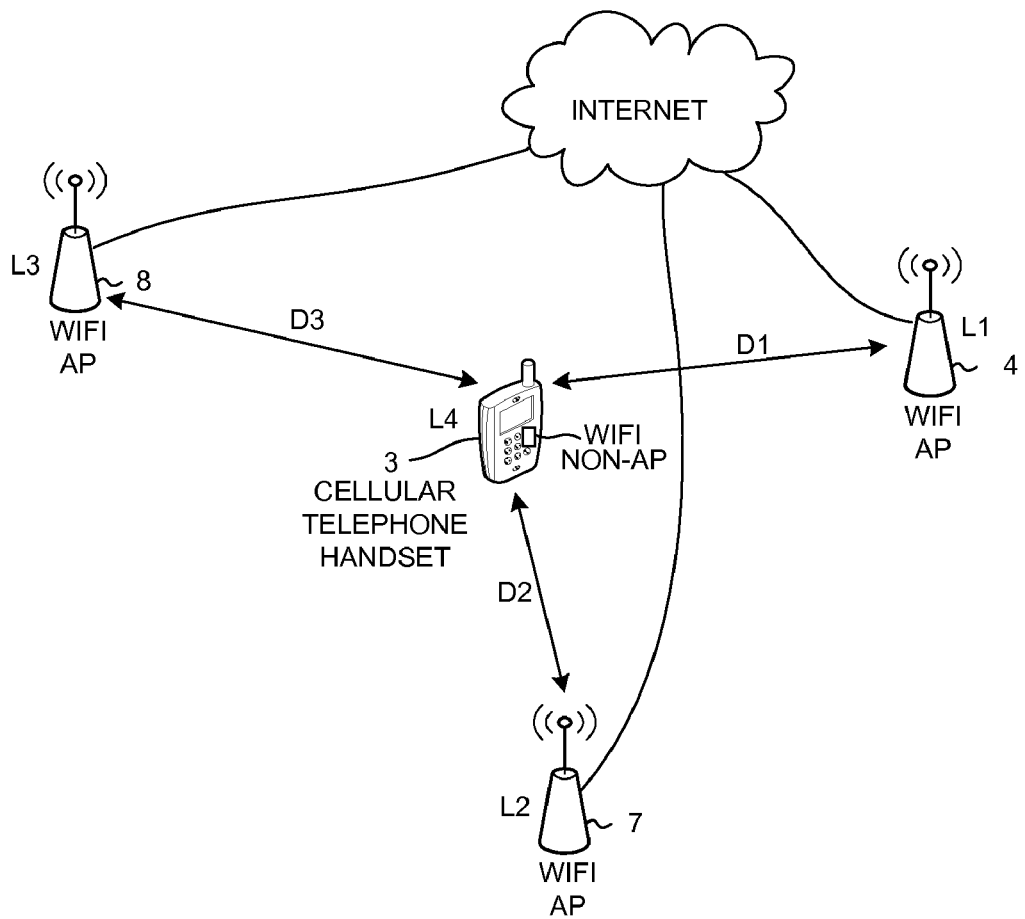
FIG. 5 is a diagram of a use of the low-power time-of-propagation distance-determining transaction of FIG. 1 in a location-determining application.

FIG. 5 is a diagram of a use of the low-power time-of-propagation distance-determining transaction in a location-determining application. Handset 3 conducts a low-power time-of-propagation distance-determining transaction with each of several APs 4, 7 and 8, thereby determining distances D1, D2 and D3. The lowest overall transmit energy setting used to send probe requests to one of the APs may be different from the lowest overall transmit energy setting used to send probe requests to another of the APs. The determinations of distances D1, D2 and D3 along with location information L1, L2 and L3 on APs 4, 7 and 8 are then used by handset 3 to determine the location L4 of handset 3 by triangulation. Handset 3 typically sends out multiple probe requests to each AP station in order to get an average result which reduces error from random sources of noise. The location determination may be used for location-based context-aware computing. How frequently such distance-determining transactions are carried out generally depends on the application program running on the handset. A distance-determining transaction may be successfully carried out without the handset ever "associating" with the AP and without the handset ever connecting to a network. As handset 3 moves around in the area served by multiple APs 4, 7 and 8, the handset 3 periodically updates its location information L4 by periodically performing the low-power distance-determining transactions and triangulation determinations. Distance-determining transactions may occur relatively frequently such as once a second. Distance-determining transactions may be performed more frequently than background scanning is done for roaming.

Figure 6:
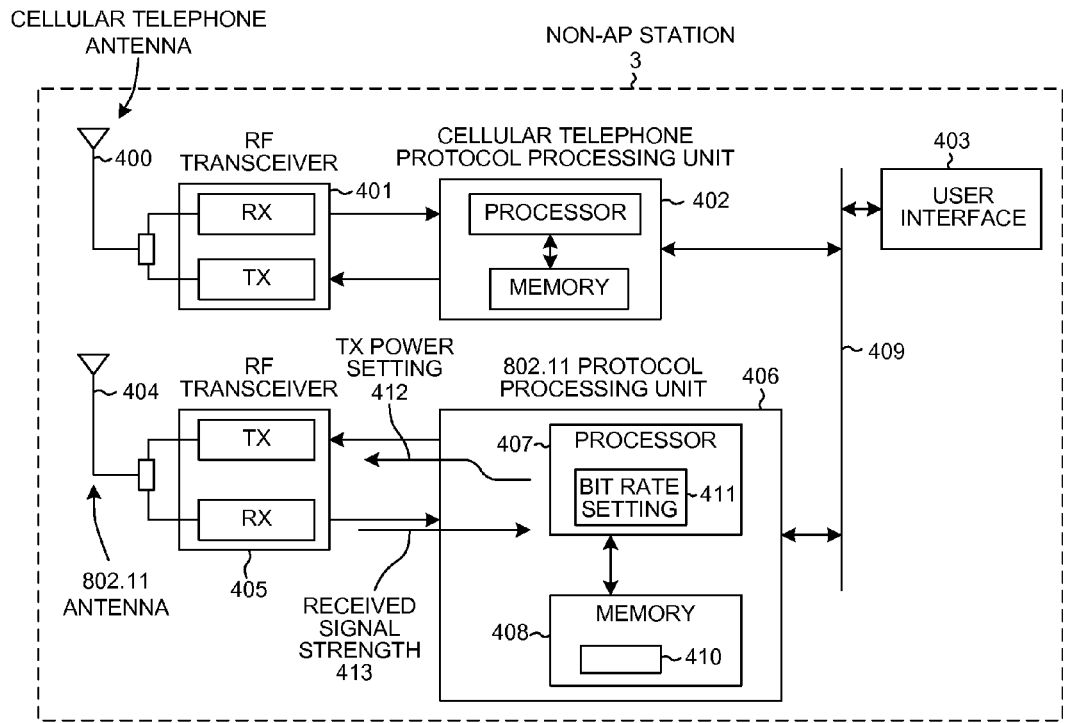
FIG. 6 is a block diagram of the non-AP station 3 of FIG. 5.

FIG. 6 is a simplified block diagram of non-AP station 3 of FIG. 5. Non-AP station 3 in this example is a cellular telephone handset that has a cellular telephone functionality and a 802.11 functionality. The cellular telephone functionality includes an antenna 400, a Radio Frequency (RF) transceiver integrated circuit 401, a digital baseband integrated circuit 402, and user interface circuitry 403. The user interface circuitry may, for example, include a keypad, a display screen, a microphone, and a speaker. The cellular telephone functionality is usable to engage in cellular telephone communications. The 802.11 functionality includes an antenna 404, a RF transceiver integrated circuit 405, and an 802.11 protocol processing unit 406. Protocol processing unit 406 includes, among other parts not illustrated, a digital processor 407 and a memory 408. The memory stores sets of processor-executable instructions (also referred to as programs) that are executable by the processor. The cellular telephone functionality and the 802.11 functionality intercommunicate with one another via bus 409. One of the programs 410 in memory 408 is a program that determines the lowest overall transmit energy setting, and that initiates and controls distance-determining transactions that utilize the lowest overall transmit energy setting. Block 411 represents the determination, storage, and use by processor 407 of the bit rate setting. Arrow 412 represents the communication of the transmit power setting from processor 407 to the transmitter portion of transceiver 405. Arrow 413 represents the communication of a received signal strength indication from the receiver portion of transceiver 405 to the processor 407.

Figure 7:
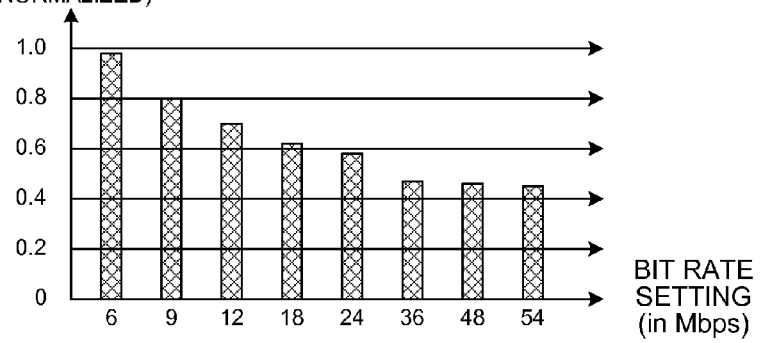
FIG. 7 is chart that illustrates how changing the bit rate setting changes the overall transmit energy of a probe request transmission (assuming a constant transmit power setting).

FIG. 7 is a chart that illustrates, for the transmission of a probe request in accordance with IEEE 802.11(a), how changing the bit rate setting changes the overall transmit energy. In the chart, the overall transmit energy values are normalized. In the example of FIG. 7 where the same approximate overall transmit energy is involved for bits rate settings of 54 Mbps, 48 Mbps and 36 Mbps, the lowest bit rate setting of 36 Mbps is used in order to increase SNR (Signal-to-Noise Ratio).

In the determination of the overall transmit energy values in the chart, the following parameters and values were used. First, after receiving a communication, the handset waits a difs amount of time (MAC parameter difs=34 microseconds) before transmitting the probe request. The values difs and sifs are MAC "carrier sense multiple access" channel access mechanism parameters that determine how the handset and AP will use the channel. During this time difs, the handset receiver is on and in one example is consuming 375 mW. Second, the handset sends a probe request. The probe length is 33 bytes. During this time, the handset transmitter is on, and is consuming 961 mW. Third, the handset then waits a maximum worst case sifs amount of time (MAC parameter sifs=16 microsecond) in a listening mode, consuming a receive power of 375 mW. Fourth, the handset receiver then receives an ACK. The ACK length is 14 bytes. The amount of time required to receive the ACK depends on the bit rate setting. The handset receiver is on during this time, and the handset is consuming 961 mW.

In one or more exemplary embodiments, the functions described may be implemented in hardware, software, firmware, or any combination thereof. If implemented in software, the functions may be stored on or transmitted over as one or more instructions or code on a computer-readable medium. Computer-readable media includes both computer storage media and communication media including any medium that facilitates transfer of a computer program from one place to another. A storage media may be any available media that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, includes compact disc (CD), laser disc, optical disc, digital versatile disc (DVD), floppy disk and blu-ray disc where disks usually reproduce data magnetically, while discs reproduce data optically with lasers. Combinations of the above should also be included within the scope of computer-readable media. In one specific example, memory 408 of FIG. 6 is a computer-readable medium that stores a program 410 of computer-executable instructions, where program 410 is accessed and executed by processor 407 of FIG. 6, and where execution of program 410 causes non-AP station 3 of FIG. 6 to carry out the method of FIG. 4.

Although certain specific embodiments are described above for instructional purposes, the teachings of this patent document have general applicability and are not limited to the specific embodiments described above. Although the determination of the lowest overall transmit energy setting is explained above as part of a distance-determining method, the determination of the lowest overall transmit energy setting need not be part of a distance-determining method but rather is broadly applicable to reducing energy consumption in the transmission of packets other than probe packets and in applications other than a distance-determining method. One way to adjust bit rate is to adjust the number of streams in a MIMO transmitter. Accordingly, various modifications, adaptations, and combinations of the various features of the described specific embodiments can be practiced without departing from the scope of the claims that are set forth below.

What is claimed is:

1. A method comprising:
(a) determining a lowest overall transmit energy setting that will give acceptable reception of a probe request sent by a handset to an Access Point station (AP station), the determining the lowest overall transmit energy further comprising
receiving a signal onto the handset from the AP station, wherein the signal is known by the handset to have been transmitted with a particular overall transmit energy,
determining a channel loss involved in a transmission of the signal from the AP station to the handset, and
determining the lowest overall transmit energy by taking a predetermined overall transmit energy setting and adjusting the predetermined overall transmit energy setting to compensate for the determined channel loss;
(b) using the lowest overall transmit energy setting determined in (a) to send a probe request out from the handset in a time-of-propagation distance-determining transaction.

2. The method of claim 1, wherein the lowest overall transmit energy setting includes a bit rate setting and a transmit power setting.

3. The method of claim 1, wherein the determining of (a) involves:
sending a sequence of transmissions from the handset to the AP station using decreasing overall transmit energy settings until a transmission is sent without an acknowledgement (ACK) being received back; and
determining the lowest overall transmit energy setting in (a) to be the overall transmit energy setting used in the sequence that had the lowest overall transmit energy and that did result in an ACK being received back.

4. The method of claim 1, wherein the determining of (a) involves:
sending a sequence of transmissions from the handset to the AP, wherein the overall transmit energy settings of the transmissions of the sequence are changed in a binary search pattern such that the lowest overall transmit energy setting of a transmission that resulted in an acknowledgement (ACK) being received back is determined.

5. A method comprising:
(a) determining a transmit power setting that is the lowest transmit power setting, for a predetermined bit rate, that gives acceptable reception of a probe request sent by a handset to an Access Point station (AP station), the determining a transmit power setting further comprising sending a sequence of transmissions from the handset to the AP, wherein each transmission is sent using an overall transmit energy setting, wherein the overall transmit energy settings of the transmissions of the sequence are changed in a binary search pattern such that the lowest overall transmit energy setting of a transmission that resulted in an acknowledgement (ACK) being received back is determined; and
(b) using the transmit power setting determined in (a) to send a probe request out from the handset to the AP station in a time-of-propagation distance-determining transaction, wherein the probe request is sent using the predetermined bit rate.

6. The method of claim 5, wherein the determining of (a) involves:
determining a channel loss by receiving a signal onto the handset from the AP station; and adjusting a transmit power setting of an overall transmit energy setting to compensate for the determined channel loss and thereby determining the transmit power setting in (a).

7. The method of claim 5, wherein the determining of (a) involves:

sending a sequence of transmissions from the handset to the AP station using decreasing transmit power settings until a transmission is sent but no acknowledgement (ACK) is received back, wherein the transmissions of the sequence are all sent using the same bit rate setting; and determining the transmit power setting in (a) to be the smallest transmit power setting used in the sequence that resulted in an ACK being received back.

8. An apparatus comprising:

an antenna; and means, coupled to the antenna, for (a) determining a lowest overall transmit energy setting that will give acceptable reception of a probe request sent by a non-Access Point station (non-AP station) to an Access Point station (AP station), and for (b) using the lowest overall transmit energy setting determined in (a) to send a probe request out from the non-AP station from the antenna in a time-of-propagation distance-determining transaction;

the means also for determining the lowest overall transmit energy setting by:

determining a channel loss involved in a transmission of a signal from the AP station to the non-AP station; and determining the lowest overall transmit energy setting by taking a predetermined overall transmit energy setting and adjusting the predetermined overall transmit energy setting to compensate for the determined channel loss.

9. The apparatus of claim 8, wherein the lowest overall transmit energy setting includes a bit rate setting and a transmit power setting.

10. The apparatus of claim 8, wherein the means is also for determining the lowest overall transmit energy setting by:

causing the non-AP station to send a sequence of transmissions from the non-AP station to the AP station using different overall transmit energy settings; and determining the lowest overall transmit energy setting in (a) to be the overall transmit energy setting used in the transmission of the sequence that resulted in an ACK being sent back.

11. A computer program product, comprising:

non-transitory computer-readable medium comprising:

code for determining a lowest overall transmit energy setting that will give acceptable reception of a probe request sent by a non-AP station (non-AP station) to an Access Point station (AP station), the code for determining the lowest overall transmit energy further comprising receiving a signal onto the handset from the AP station, wherein the signal is known by the handset to have been transmitted with a particular overall transmit energy, determining a channel loss involved in a transmission of the signal from the AP station to the handset, and determining the lowest overall transmit energy by taking a predetermined overall transmit energy setting and adjusting the predetermined overall transmit energy setting to compensate for the determined channel loss; and code for causing the determined lowest overall transmit energy setting to be used in a sending of a probe request out from the non-AP station in a time-of-propagation distance-determining transaction.

* * * * *